Sept. 19, 1967     L. ALAMPRESE ET AL     3,342,412
ROD-AND-TUBE SENSOR
Filed Aug. 16, 1965
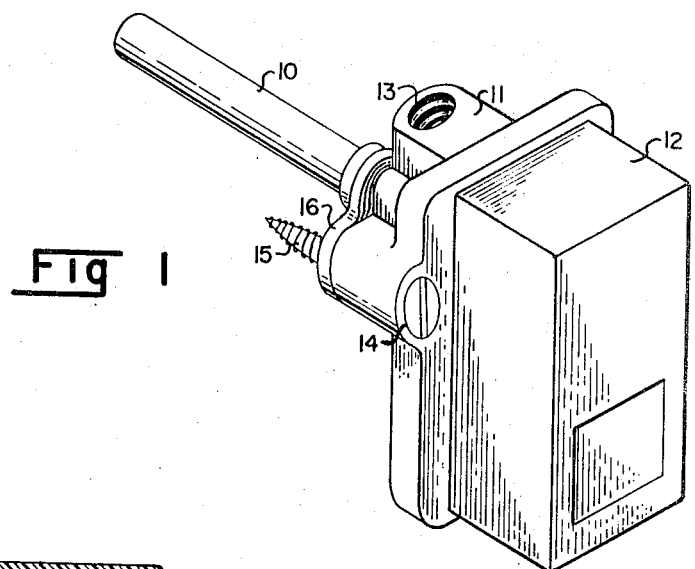
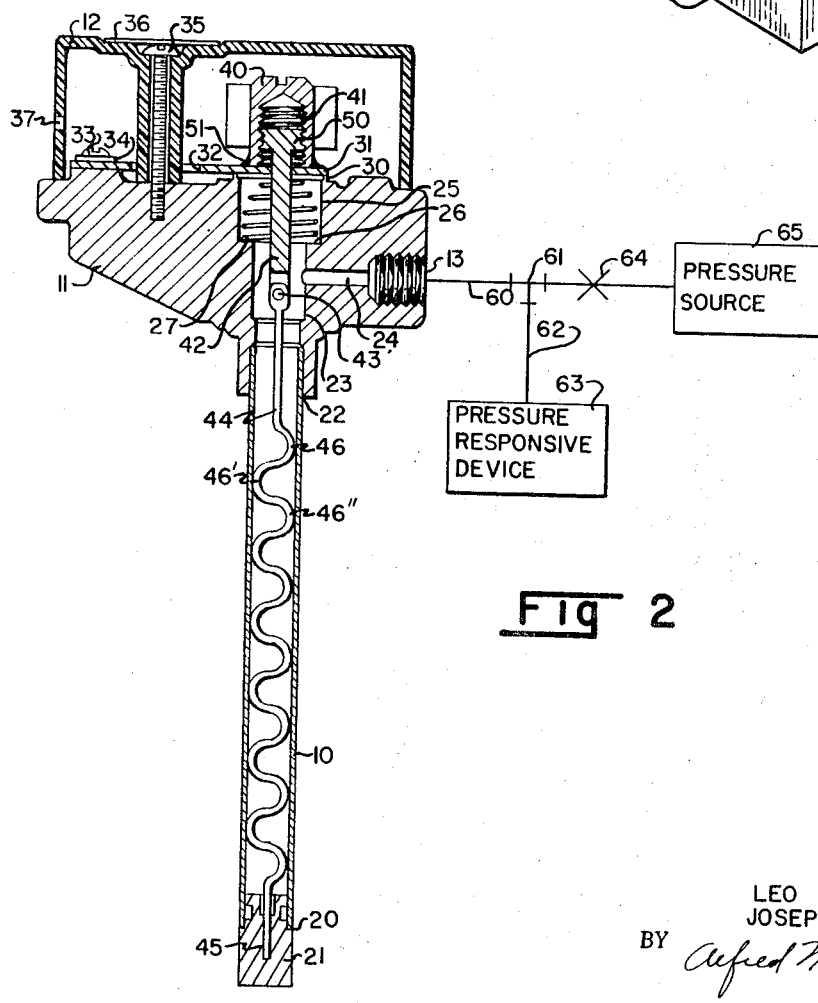
INVENTORS
LEO ALAMPRESE
JOSEPH E. HOGEL
BY Alfred N. Feldman
ATTORNEY

United States Patent Office

3,342,412
Patented Sept. 19, 1967

3,342,412
ROD-AND-TUBE SENSOR
Leo Alamprese, Elmhurst, and Joseph E. Hogel, River Grove, Ill., assignors to Honeywell Inc., Minneapolis, Minn., a corporation of Delaware
Filed Aug. 16, 1965, Ser. No. 479,783
5 Claims. (Cl. 236—87)

ABSTRACT OF THE DISCLOSURE

A sensor of the rod-and-tube type where the rod, which is made of material with a low coefficient of the thermal expansion, is formed with coils or convolutions so that it serves the additional function of a biasing spring.

The present invention is directed to an improved type of rod-and-tube temperature responsive device of the general type disclosed in the United States Patent No. 3,174,499 issued Mar. 23, 1965, to R. C. Mott, and assigned to assignee of the present invention.

Broadly, a rod-and-tube type temperature responsive device is quite old, but these devices are extensively used in control systems at the present time. One of the main drawbacks of the rod-and-tube type of sensor is the need for a long temperature sensitive section. This long temperature sensitive section is a result of the inherent characteristics of the device and in many applications is undesirable. The present invention is directed to an improved rod-and-tube type of temperature sensing device that is reduced in length along with a reduction in the complexity and cost of manufacture. This improved sensor or temperature responsive device is provided by the elimination of a spring that normally attaches the rod of the device to the condition control means itself. The rod performs two functions in the improved embodiment. The first function is the normal temperature responsive function along with the tube, while the second function is to provide a spring bias in place of a normally used spring element. Simply stated, the present invention is directed to the combination of two functions, that is the sensing function and the spring function, within the single element used for sensing by providing that element with at least one convolution to form a spring-like member.

The present invention will be fully understood when considered with the attached drawing, wherein:

FIGURE 1 is an isometric view of a rod-and-tube temperature sensing element of a pneumatic type; and FIGURE 2 is a cross-section of the temperature sensing element of FIGURE 1, when connected to a schematically shown pneumatic circuit.

In FIGURE 1 there is disclosed an isometric view of a temperature responsive device of a rod-and-tube type incorporating the present invention. The temperature responsive device has tube means 10 formed of a material such as brass which expands quite readily upon exposure to increased temperature. The tube means 10 enters a cast housing means 11 which supports a condition control means (later disclosed) covered by a convenient cover 12. The housing means 11 has a threaded inlet 13 for a pneumatic input means, as will be described below and also includes a hole 14 through which a screw 15 passes to mount the device into the side of duct work or similar structure for actual application to a temperature control system. A gasket 16 is provided on the housing means 11 to seal the device in an airtight fashion, as is well known in the art.

In FIGURE 2, the device of FIGURE 1 is disclosed in cross-section. The tube means 10 is shown sealed at 20 by a plug 21. The tube 20 further is inserted in an airtight manner in a hole 22 in the end of the housing 11. The housing 11 further includes a pressure chamber 23 that has an opening 24 that connects to the threaded opening 13 to form the pneumatic input means for the pressure chamber 23. The pressure chamber 23 has an expanded open section 25 that has a shoulder 26 that supports a spring 27. The opening 26 is terminated in a nozzle means 30 of a type substantially identical to that disclosed in the previously mentioned Mott patent. The spring 27 is supported between the shoulder 26 and a movable member or flapper valve 31 that in effect is a flat plate. The flapper valve 31 is the bight section of a U-shaped plate which has one leg 32 shown in FIGURE 2. The leg 32 of the U-shaped member is mounted by a screw 33 and washer 34 to the body means 11. The flapper valve 31 is in effect a flat plate that opens and closes over the nozzle 30 to control the exodus of air supplied to the inlet 13 when the device is in operation.

In order to protect the structure from damage, the cover 12 is provided and is mounted by a single screw 35 that is covered by a plate 36. The cover 12 is of a protective nature and performs no control function. The cover 12 further has a vent hole 37 to allow the air flow from the flapper valve 31 to expand to the atmosphere freely without interferring in the operation of the device.

Mounted on the flapper valve 31 is a nut member 40 having an internal threaded section 41 which receives a bolt-like member 42 that projects into the pressure chamber 23 and is terminated at 43 in a joint with a rod 44. The rod 44 extends from the junction 43 to the plug 21 where it is rigidly attached at 45. The rod 44 is made of a material generally referred to as Invar and this material is a metal that has a low coefficient of linear expansion with changes in temperature. This material is well known in the temperature control art and it is not believed necessary to describe it, other than referring to it as an Invar rod.

The rod 44 has an unusual configuration as compared to a conventional rod in that the rod 44 has a number of convolutions 46, 46', 46", etc. The number of convolutions will vary from device to device depending on the characteristics desired. The convolutions 46, 46', 46", etc., allow the rod 44 to have a spring-like characteristic thereby providing a resilient tension between the ends 43 of the member 42 and the plug 21 of the tube 20. The rod 44 is shortened in its overall length by the convolutions 46, 46', 46", etc., as well as providing a spring bias on the movable member or flapper valve 31. The tension on the rod 44 and on the flapper valve 31 is determined by tightening the nut 40 on a threaded end 50 of the member 42. After the proper tension has been adjusted in the manufacture of this device, a cement 51 is placed around the nut 40 to seal it against further motion in the use of the device. This is a factory adjustment that is made during the calibration of the temperature responsive device disclosed in FIGURE 2.

The threaded inlet 13 is connected to a pipe 60 that is teed at 61 to the pipe 62 that in turn is connected to some type of pressure responsive device 63. The type of device is not material to the present invention. The T 61 is further connected through a restriction 64 to a pressure source 65. This completes the device in its normal environment. In operation, the pressure source 65 supplied some fixed pressure through the orifice 64 to the device of the present invention, as well as, to the pressure responsive device 63. The pressure enters the pressure chamber 23 and applies a pneumatic bias to the flapper valve 31. The flapper valve 31 tends to lift bleeding air past the nozzle 30 to the atmosphere. A balance is established between the flapper valve 31 and the nozzle 30 dependent on the presure in the chamber 23 and the spring force or resilient tension applied by the rod element 44. The resilient characteristic of the convolutions 46, 46′, 46″, etc., provides a bias to provide a balance point depending on the temperature to which the tube means 10 is exposed. As the tube means 10 is exposed to a higher temperature, the tube expands applying a higher force to the flapper valve 31. As the temperature surrounding the tube means 10 decreases, the tube means 10 shortens in length thereby decreasing the force applied to the flapper valve 31. This function is well known in the rod-and-tube temperature responsive art. The heart of the present invention is the incorporation of the resilient feature in the rod 44 itself thereby allowing a characteristic that will be described below.

In the manufacture of ordinary rod-and-tube sensors the length of the sensor is normally not important and a straight rod is used. This is disclosed in the Mott patent previously mentioned. A spring is then placed between the rod 44 and the flapper valve 31 of the device. In a relatively long device this can be accomplished without problem. Also in devices that have a very small range of temperatures, this same function can be accomplished without the present invention. In order to manufacture a short sensor, approximately six inches in length, having a 100° Fahrenheit span of operation, a spring would be required having a spring rate of approximately 1000 pounds per inch. Due to this exceedingly high spring rate it is very difficult to manufacture a spring that is accurate and consistent. Since it is very difficult to manufacture a spring accurately having the spring rate required for the particular design involved, it has been found that the zigzag or convolutions 46, 46′, 46″, etc., in the rod 44 accomplished both the sensing function and spring biasing effect in a very consistent fashion. The use of the rod 44 as both the sensing device and as the spring also eliminates one joint in the manufacture thereby improving the reliability and characteristics of the device.

Test results on the device of the type disclosed in FIGURE 2 have shown that the device can be readily built within easy manufacturing tolerances and therefore can be built well within the degree of accuracy required for a commerical temperature responsive device having a relatively short insertion length and a relatively large range of temperatures to which it can be applied. The incorporation of the convolutions also saves manufacturing costs, as well as, providing a device that would not be readily producible in a conventional fashion of the type disclosed in the Mott Patent 3,174,499. The type of convolution, whether flat, helical, or in some other configuration, is not material to the present invention. The heart of the present invention is the elimination of the conventional spring thereby eliminating the problems that go along with the manufacture of a spring having a spring rate of approximately 1000 pounds per inch and in the simplification of the manufacture of a rod-and-tube type of temperature sensing device. The single embodiment disclosed is the preferred embodiment, but by no means is the only manner in which the present invention could be applied. For this reason, the applicant's wish to be limited in the scope of their invention solely by the scope of the attached claims.

We claim as our invention:

1. A pneumatic temperature responsive device adapted for connection with a source of fluid pressure, comprising:
   a housing;
   condition control means cooperating with the housing and including a movable portion for venting the housing in accordance with changes in temperature;
   tube means having first and second ends, the first end attached to the housing and the second end remote from the housing thereby free to expand and contract axially with changes in temperature, the distance between the second end of the tube means and the movable portion of the condition control means being of a predetermied minimum magnitude;
   a unitary rod formed with at least one convolution be-between its ends, the rod having a predetermined length in an unstressed state, said length being less than said minimum distance, the rod connected between the second end of the tube means and the movable portion of the condition control means so as to be in a state of tension, and thereby impart a force to the movable portion of the condition control means that varies in accordance with the expansions and contractions of the second end of the tube means;
   biasing means for imparting a force to the movable portion of the condition control means in opposition to the force imparted to the movable portion by the rod;
   and inlet means communicating with the housing, said inlet means adapted for connection with a pressure source and with a pressure responsive device.

2. The device as described in claim 1, wherein the unitary rod and the biasing means are in substantial axial alignment.

3. The device as described in claim 1, wherein the housing, the tube means, and the condition control means together form a pressure chamber the pressure of which is controlled by the condition control means.

4. The device as described in claim 1, wherein the condition control means comprises a nozzle and a flapper.

5. The device as described in claim 1, wherein the rod is made of a metal having a low coefficient of linear expansion with change in temperature.

References Cited

UNITED STATES PATENTS

| | | | |
|---|---|---|---|
| 401,772 | 4/1889 | Brigham | 236—59 |
| 896,588 | 8/1908 | Saugstad | 236—87 X |
| 912,286 | 2/1909 | Comfort | 236—87 |
| 912,288 | 2/1909 | Comfort | 236—87 |
| 969,848 | 9/1910 | Davis | 236—102 |

FOREIGN PATENTS

| | | |
|---|---|---|
| 206,661 | 2/1909 | Germany. |
| 666,177 | 2/1952 | Great Britain. |

EDWARD J. MICHAEL, *Primary Examiner.*